(12) United States Patent
Kuczynski et al.

(10) Patent No.: US 10,331,911 B2
(45) Date of Patent: Jun. 25, 2019

(54) SECURE CRYPTO MODULE INCLUDING SECURITY LAYERS

(71) Applicant: International Business Machines Corporation, Armonk, NY (US)

(72) Inventors: Joseph Kuczynski, North Port, FL (US); Phillip V. Mann, Rochester, MN (US); Kevin M. O'Connell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 15/197,309

(22) Filed: Jun. 29, 2016

(65) Prior Publication Data

US 2018/0004980 A1   Jan. 4, 2018

(51) Int. Cl.
*H04L 29/00* (2006.01)
*G06F 21/72* (2013.01)
*G06F 21/87* (2013.01)

(52) U.S. Cl.
CPC ............. *G06F 21/72* (2013.01); *G06F 21/87* (2013.01)

(58) Field of Classification Search
CPC ................................ G06F 21/72; G06F 21/87
USPC ......................................................... 713/192
See application file for complete search history.

(56) References Cited

U.S. PATENT DOCUMENTS

| | | | |
|---|---|---|---|
| 5,406,630 A * | 4/1995 | Piosenka | G01K 7/01 257/E23.08 |
| 5,858,500 A | 1/1999 | MacPherson | |
| 7,436,316 B2 * | 10/2008 | Fleischman | G06F 21/86 250/224 |
| 7,518,507 B2 | 4/2009 | Dalzell et al. | |
| 8,198,641 B2 | 6/2012 | Zachariasse | |
| 9,263,605 B1 | 2/2016 | Morgan et al. | |
| 2004/0062683 A1 | 4/2004 | Yam et al. | |
| 2012/0222723 A1 | 9/2012 | Meyer et al. | |
| 2013/0284266 A1 | 10/2013 | Takeda et al. | |
| 2014/0036486 A1 | 2/2014 | Lin et al. | |

(Continued)

FOREIGN PATENT DOCUMENTS

WO   2013/142962 A1   10/2013

OTHER PUBLICATIONS

Pires et al.; "Polycarbazole-Based Organic Photodiodes for High Sensitive Chemiluminescent Immunoassays", EMBC IEEE 35th Inter. Conf. on, Jul. 3-7, 2013, pp. 1700-1703.

(Continued)

*Primary Examiner* — Brandon S Hoffman
*Assistant Examiner* — Michael D Anderson
(74) *Attorney, Agent, or Firm* — ZIP Group PLLC (57) ABSTRACT

An electromagnetic radiation (EMR) receiver is located upon a printed circuit board (PCB) glass security layer. EMR flux is transmitted by the glass security layer and received by the EMR receiver. When the PCB is subject to a tamper event the EMR transmitted by glass security layer is increased. A monitoring device that monitors the flux or interference pattern of the EMR received by the EMR receiver detects a change in flux or interference pattern and passes a tamper signal to one or more computer system devices to respond to the tamper event. For example, one or more cryptographic adapter card or computer system functions or secured crypto components may be disabled.

20 Claims, 6 Drawing Sheets

(56) References Cited

U.S. PATENT DOCUMENTS

| | | |
|---|---|---|
| 2014/0326306 A1 | 11/2014 | Lin et al. |
| 2014/0376118 A1 | 12/2014 | Giebink et al. |
| 2015/0194555 A1 | 7/2015 | Zhang et al. |
| 2015/0207001 A1 | 7/2015 | Lin et al. |
| 2015/0329406 A1 | 11/2015 | Kawamoto et al. |
| 2016/0027946 A1 | 1/2016 | Tokuhisa |

OTHER PUBLICATIONS

Caputo et al.; "Microfluidic Chip With Integrated a-Si: H Photodiodes for Chemiluminescence-Based Bioassays", IEEE Sensors Journal, vol. 3, No. 7, Jul. 2013, pp. 2595-2602.
Banaei et al.; "Design and Fabrication of Polymer-Fiber-Based Luminescent Solar Concentrator Fabrics", Lasers and Electro-Optics, IEEE Conf. on, May 6-11, 2012, pp. 1-2.
Zhao et al., ; "Near-Infrared Harvesting Transparent Luminescent Solar Concentrators," published by WILEY-VCH Verlag GmbH & Co. KGaA, Weinheim, in Adv. Optical Mater, 2014.

* cited by examiner

SECURE CRYPTO MODULE INCLUDING SECURITY LAYERS

FIELD OF THE INVENTION

Embodiments of the invention generally relate to computer systems and more particularly to computer systems that have a secure crypto module including a security layer and a glass security layer that transfers electromagnetic radiation (EMR).

DESCRIPTION OF THE RELATED ART

A cryptographic module is a set of hardware, software, firmware, or some combination thereof that implements cryptographic logic or cryptographic processes, including cryptographic algorithms, and is contained within the cryptographic boundary of the module. U.S. Government Federal Information Processing Standard (FIPS) 140-2 Security Requirements for Cryptographic Modules—(Level 4) is a standard that specifies security requirements for cryptographic modules. This standard requires that physical security mechanisms provide a complete envelope of protection around the cryptographic module with the intent of detecting and responding to all unauthorized attempts at physical access.

A non-exhaustive list of a cryptographic modules is as follows: cryptographic coprocessor, cryptographic accelerator, cryptographic adapter card, cryptographic field programmable gate array (FPGA), memory storing cryptographic accelerator data, etc.

In a particular example of a cryptographic module, a cryptographic coprocessor is a secure cryptoprocessor that performs cryptographic operations used by application programs and by data handling operations, such as SSL (Secure Sockets Layer) private key transactions associated with SSL digital certificates. The cryptoprocessor includes a tamper-responding hardware security module that provides secure storage for storing crypto keys and other sensitive data. Cryptoprocessor applications may include financial PIN (Personal Identification Number) transactions, bank-to-clearing-house transactions, EMV (Europay®, MasterCard®, and Visa®) transactions for integrated circuit (chip) based credit cards, basic SET (Secure Electronic Transaction) block processing, and general-purpose cryptographic applications using symmetric key, hashing, and public key algorithms. The crypto keys may be generated in the cryptoprocessor and may be saved in a keystore file encrypted under a master key of that cryptoprocessor.

In another particular example of a cryptographic module, a cryptographic adapter card includes a printed circuit board that may be plugged into a computer system motherboard. The cryptographic adapter card includes a secure crypto module that contains and generally forms a boundary to one or more other cryptographic modules contained therein forming the envelope of protection around the one or more other cryptographic module(s). Secure crypto modules typically include tamper sensors that detect and respond to unauthorized attempts at physical access.

SUMMARY

In an embodiment of the present invention, a cryptographic printed circuit board (PCB) includes a crypto component encapsulated by a glass security layer, an electromagnetic radiation (EMR) receiver optically connected to the glass security layer, and a destruct feature electrically connected to the EMR receiver. The destruct feature is programmed in response to the EMR receiver receiving a predetermined threshold increase of flux of EMR propagated by the glass security layer to the EMR receiver.

In another embodiment of the present invention, a data handling electronic device includes a motherboard comprising a processor and a memory and a cryptographic adapter card. The cryptographic adapter card includes a printed circuit board (PCB) comprising a connector that interconnects with the motherboard and a secure crypto module comprising a daughter card electrically connected to the PCB. The daughter card includes a crypto component encapsulated by a glass security layer, an electromagnetic radiation (EMR) receiver optically connected to the glass security layer, and a destruct feature electrically connected to the EMR receiver. The destruct feature is programmed in response to the EMR receiver receiving a predetermined threshold increase of flux of EMR propagated by the glass security layer to the EMR receiver.

In another embodiment of the present invention, a method of fabricating a cryptographic printed circuit board (PCB) includes forming a glass security layer upon a PCB wiring layer, attaching an electromagnetic radiation (EMR) receiver optically connected to the glass security layer, forming a security layer upon the glass security layer and upon the EMR receiver, and electrically connecting a monitor device to the EMR receiver such that the monitor device detects a threshold increase of threshold increase of flux of EMR propagated by the glass security layer to the EMR receiver.

These and other embodiments, features, aspects, and advantages will become better understood with reference to the following description, appended claims, and accompanying drawings.

DETAILED DESCRIPTION

A glass security layer is located upon or within a printed circuit board (PCB). The PCB is utilized by a cryptographic adapter card that includes one or more secure crypto components that carry out cryptographic data handling functions. The glass security layer may be located upon a PCB of the crypto adapter card and/or upon a daughter PCB attached thereto. The crypto adapter card may be installed within a computer system that performs cryptographic functions utilizing one or more secured crypto components. The glass security layer may generally identify an unauthorized physical access attempt. The glass security layer is further connected to an electromagnetic radiation (EMR) receiver such that EMR emitted or transmitted by the glass security layer is transferred to the EMR receiver.

In an embodiment, in normal operation, an opaque security layer blocks ambient light from being accepted and transmitted by the glass security layer and from being received by the EMR receiver. When the opaque security layer is accessed (e.g., drilled, sawed, cut, etc.), the glass security layer becomes exposed to ambient light thereby transferring EMR flux to the EMR receiver. The actual flux of the received EMR at the EMR receiver is resultantly altered.

In another embodiment, the glass security layer includes numerous EMR emitters (e.g., luminophores, luminescent solar concentrators, or the like). Upon a tampering triggering event as is further described herein, the EMR emitters emits EMR flux which is transferred by the glass security layer and detected at the EMR receiver.

In an embodiment, the actual flux of the received EMR at the EMR receiver is compared against a predetermined reference flux (e.g., expected flux, etc.) of the received EMR at the EMR receiver. For clarity, the term flux, or the like, referred to herein, is the radiant flux or luminous flux of EMR detected or received at the EMR receiver.

An EMR monitor device monitors the actual flux of the received EMR at the EMR receiver in relation to the reference flux or reference interference pattern respectively. The EMR monitor device passes a tamper signal that is received by one or more computer system devices to respond to the unauthorized physical access of the PCB when the actual flux of the received EMR at the EMR receiver deviates from the reference flux by a predetermined threshold amount. The tamper signal may cause one or more cryptographic adapter card functions, computer system functions, or secured crypto components to be disabled.

Figure 1:
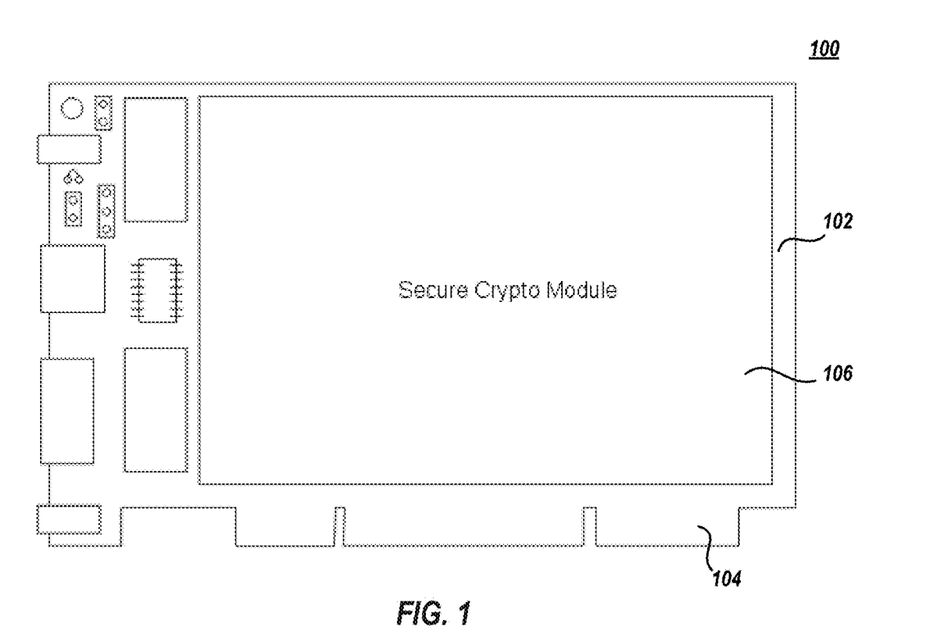
FIG. 1 illustrates an exemplary cryptographic adapter card including a secure crypto module that utilize various embodiments of the present invention.

Referring to the drawings, wherein like numbers denote like parts throughout the several views, FIG. 1 illustrates a cryptographic adapter card 100 which includes a secure crypto module 106. Cryptographic adapter card 100 includes a printed circuit board (PCB) 102 and connector 104 that can be inserted into an electrical connector, or expansion slot on a computer motherboard, backplane or riser to add cryptographic functionality to the computer via an expansion bus. PCB 102 provides mechanical support for various electronic components as well as electrically conductive pathways, also referred herein as traces, to provide for electrical communication (e.g., data transfer, etc.) as is known in the art. The computer motherboard, backplane or riser, hereinafter referred to as a motherboard, provides mechanical support for computer components such as a processor and memory and includes traces for electrical communication to and from the computer components, as is known in the art. The expansion bus, a particular mother board trace, is a computer bus which moves information between the internal hardware of the computer (e.g., the processor and memory) and peripheral devices.

Figure 2:
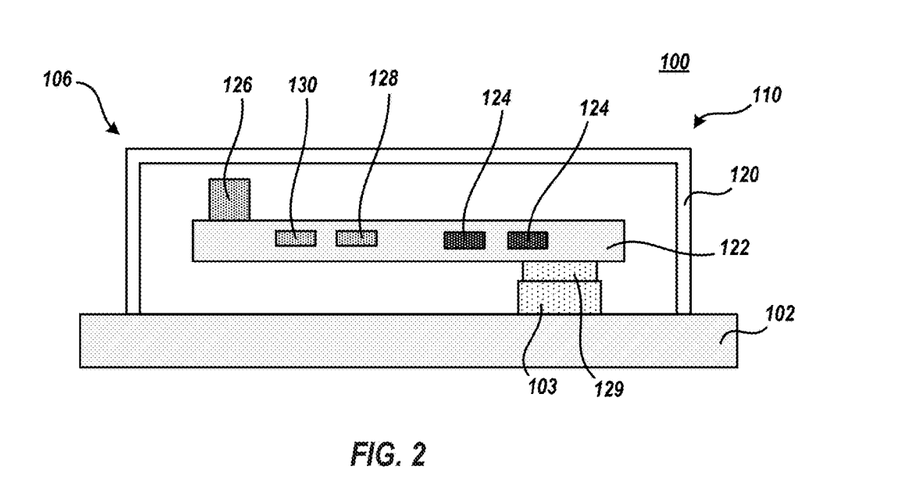
FIG. 2 illustrates an exemplary cross section of an exemplary cryptographic adapter card that includes a cryptographic printed circuit board (PCB) module, according to various embodiments of the present invention.

Secure crypto module 106 provides a complete envelope of protection around a cryptographic PCB module 110, exemplarily shown in FIG. 2, to detect and respond to unauthorized attempts at physical access or tampering therewith.

FIG. 2 illustrates an exemplary cross section of cryptographic adapter card 100. Secure crypto module 106 includes cryptographic PBC module 110 and may include a shield 120. Cryptographic module 110 is a collective set of hardware that physically resides upon or imbedded within daughter PCB 122 which calls software to implement cryptographic logic or cryptographic processes, including cryptographic algorithms. The cryptographic module 110 may be contained within a perimeter boundary or shield 120 of the secure crypto module 106.

As is further described herein, PCB 102 and/or daughter PCB 122 includes security layers that detect unauthorized physical access attempts to the PCB. The security layers include a glass security layer and a security layer. The glass security layer may be located in various locations within the PCB buildup or stack. For example, the glass security layer may be nearest the PCB upper surface and/or lower surface, or may alternatively be located within an internal layer or portion of the PCB. The glass security layer is generally an EMR transmission medium.

Depending upon the implementation, the security layer has different functions. In an implementation, the security layer is opaque such that in normal operation the security layer generally blocks EMR flux from entering into glass security layer. In another implementation, the security layer generally blocks potential chemical reactants from accessing the glass security layer. In another implementation, the security layer is an encapsulation layer that generally surrounds the PCB. In another implementation, the security layer protects the glass security layer from being scratched, crushed, rubbed, shattered, or generally damaged from an externally applied load. In another implementation, the security layer protects the glass security layer from radiation. For clarity, the implementations of the security layer above may be combined such that the security layer has multiple functions or purposes.

Physical access of one or more of the security layers may result in flux received by the EMR receiver. For example, subsequent to the physical access of the opaque security layer ambient light enters and is transferred by the glass security layer and is received by the EMR receiver. In another example, EMR emitters associated with the glass security layer emit EMR which is transferred by the glass material of the glass security layer and is received by the EMR receiver. In yet another example, EMR may be detected by the EMR receiver as a result of the external heating or cooling of the PCB. The detection of flux may result in the zeroization of area(s) of the one or more crypto components 124 where sensitive data is stored (e.g., zeros are written to storage areas, storage areas are wiped, or the like), disabling of the one or more crypto components 124, etc.

Cryptographic module 110 includes a daughter PCB 122 and one or more crypto devices 124. Cryptographic module 110 may further include battery 126, enable device 128, connector 103, connector 129, and monitor device 130. Daughter PCB 122 provides mechanical support for crypto devices 124, battery 126, enable device 128, and monitor device 130, when included within cryptographic module 110. Daughter PCB 122 includes electrical traces therein that provide for the connection of one or more crypto devices 124 to other electrical devices upon the daughter PCB 122, upon PCB 102, and/or upon the computer system motherboard, etc. Connector 129 electrically connects the daughter PCB 122 to PCB 102 via PCB connector 103.

The various connectors and traces contemplated herein generally allow for crypto devices 124 to electrically communicate with one or more computer components of the motherboard. When cryptographic adapter card 100 is not connected to the motherboard (where electrical potential is provided therefrom), battery 126 may provide electric potential to enable device 128 to program or enable a destruct feature within each crypto device 124. The battery 126 may further provide backup power to one or more features of the cryptographic module 110 and may be active from the time of factory initialization until the end of the cryptographic module 110 expected product life.

Crypto devices 124 are hardware computer components that implement cryptographic logic or cryptographic functions or otherwise store or handle cryptographic data. A non-exhaustive list of crypto devices 124 are a coprocessor, memory (DRAM, Flash, ROM, RAM, etc.), FPGA, surface mount component, pin-in-hole component, socketed component, a circuit, an integrated circuit, a chip, etc.

Shield 120 is an enclosure, chassis, envelope, or other perimeter shell that generally surrounds and protects the internal cryptographic module 110. Shield 120 may be absent of access or air flow cutouts to limit access to the internal cryptographic module 110. In some implementations where crypto component 124, battery 126, enable device 128, and/or monitor device 130 need cooling, a heat sink may be thermally attached to the hardware and the fins or pins of the heat sink may protrude through the shield 120. In an embodiment, shield 120 may surround the cryptographic module 110 on at least five sides, the sixth side of cryptographic module 110 being protected by the PCB 102. In another embodiment, shield 120 may surround the cryptographic module 110 on all six sides of the cryptographic module 110 with the sixth side including a cutout to allow the daughter PCB 122 to be electrically connected to PCB 102 via connectors 129, 103. In embodiments, the shield 120 may be formed from sheet metal. By surrounding the internal cryptographic module 110, shield 120 generally forms a layer of protection of the cryptographic module 110 by limiting physical penetration thereto.

Monitor device 130 is a device that monitors the actual flux of the received EMR at the EMR receiver in relation to the reference flux. For clarity, the reference flux may be predetermined to be zero, or the absence of, flux. The monitor device may include a register to store the reference value(s). Further, monitor device 130 passes a tamper signal that is received by one or more computer system devices to respond to the unauthorized physical access of the security layer(s) when the actual flux of the received EMR at the EMR receiver deviates from the reference flux by a predetermined threshold amount. Monitor device 130 may be an electrical component or circuit. In various embodiments, monitor device 130 may be an application specific integrated circuit (ASIC), field programmable gate array (FPGA), microchip, microcomputer, etc. The monitor device 130 at least includes or is electrically connected to an EMR receiver. In some embodiments, such as those where the crypto component 124 is a processing device, such as a co-processor, processor, ASIC, FPGA, etc., the monitor device 130 and the crypto component 124 may be a single device.

For clarity, crypto component 124, battery 126, enable device 128, and/or monitor device 130 may be surface mount components, pin-in-hole components, socketed components, circuits, etc. that are located upon daughter PCB 122. Further, crypto component 124, battery 126, enable device 128, and/or monitor device 130 may alternatively be imbedded within daughter PCB 122. For example, monitor device 130 may be a chip, integrated circuit, etc. upon or within daughter PCB 122. Similarly, one or more of the crypto component 124, battery 126, enable device 128, and/or monitor device 130 located upon or within daughter PCB 122 may be physically located upon or imbedded within PCB 102. In a particular embodiment, the security layers and the monitor device 130 are located upon the top and bottom sides of the PCB and the crypto component 124, battery 126, enable device 128, etc. are located internal to the security layers. In this manner, the security layers may generally form a perimeter detection boundary that surrounds and detects physical access attempts of the PCB or PCB components, such as crypto component 124, battery 126, enable device 128, traces, etc. therewithin.

Figure 3:
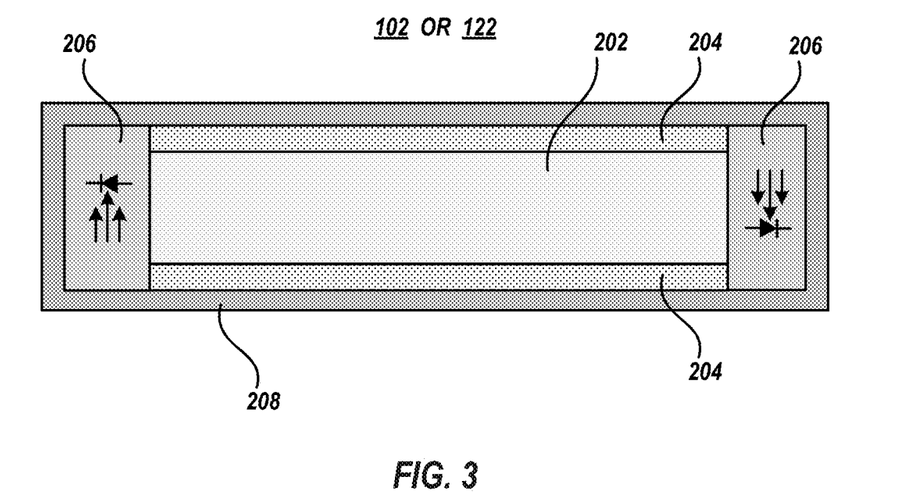
FIG. 3 illustrates an exemplary cross section view of a cryptographic adapter card PCB or a daughter PCB of the cryptographic PCB module, according to various embodiments of the present invention.

FIG. 3 illustrates an exemplary cross section view of cryptographic adapter card PCB 102 and/or daughter PCB 122 which includes security layers. The PCB 102 and/or PCB 122 includes one or more glass security layers 204 and one or more opaque security layers 208, according to various embodiments of the present invention. In a particular implementation of the cryptographic adapter card 100, only the PCB 102 and not daughter PCB 122 includes one or more glass security layers 204, or vice versa. In yet another implementation of the cryptographic adapter card 100, both the PCB 102 and daughter PCB 122 includes respective one or more glass security layers 204.

In a particular embodiment, as is shown in FIG. 3, a glass security layer 204 is formed upon a top surface and/or bottom surface of wiring layer(s) 202 of the PCB. The wiring layer(s) 202 are the traditional wiring buildup of PCBs and may include conductive traces formed upon a layer of dielectric material. The various layers may be stacked to form the PCB as is traditional in the PCB art. The conductive traces 204 may be formed by subtractive fabrication techniques such as etching conductive sheets (copper, or the like) laminated onto a dielectric substrate (e.g., prepreg, FR4, etc.). The conductive traces may alternatively be formed by positive fabrication techniques where the conductive trace is applied directly onto the dielectric substrate. For example, the conductive trace may be formed by plating, printing, etc. conductive material upon the dielectric substrate layer. The dielectric substrate layers are usually dielectric composite materials that contain a matrix, e.g., an epoxy resin and a reinforcement, e.g., a woven, sometimes nonwoven, glass fabric.

The wiring layer 202 may be a single dielectric substrate layer with conductive traces formed upon the top surface and/or bottom surface thereof. Alternatively, the wiring layer 202 may include multiple stacked dielectric substrate layers with conductive traces formed upon respective top surfaces and/or bottom surfaces. For example, conductive traces are formed upon the top surface and bottom surface of a first dielectric substrate layer. A second dielectric substrate layer is formed upon the upper surface of the first dielectric substrate layer and upon the associated conductive traces by known fabrication techniques. This process may be repeated to form the stack of multiple wiring layers as is known in the art.

Conductive traces located on different dielectric substrate layers may be connected with plated-through hole vias, blind vias, buried vias, etc. Components such as capacitors, resistors, active devices, crypto component 124, battery 126, enable device 128, and/or monitor device 130 may be formed upon particular substrate layers within wiring layer(s) 202 and connected to particular conductive traces. Conductive traces may be electrically connected to such components by known interconnection techniques and/or structures.

Glass security layer 204 is a glass layer that transfers, transmits, or the like EMR (i.e., ultraviolet light, visible light, and infrared light) to one or more EMR receivers 206. Generally, one or more EMR receivers 206 are optically connected to the glass security layer 204. The term "optically connected" means that at least the majority of the EMR transferred or propagated by the glass security layer 204 is received by the one or more EMR receivers 206. Glass security layer 204 is, therefore, a medium for the transfer of EMR. The glass security layer 204 may have the same perimeter dimensions as the underlying wiring layer(s) 202. In an embodiment, glass security layer 204 is at least partially transparent (e.g., is translucent, etc.) so as to allow the transfer of EMR. For example, glass security layer 204 may be formed from a glass material that allows EMR to pass through the material without being scattered (i.e., transparent) or a glass material that allows a predetermined amount but less than all EMR to pass through the material (i.e., translucent). The glass material of glass security layer 204 may be selected depending upon the known or expected EMR wavelength of the particular EMR being detected or monitored by the one or more EMR receivers 206.

The transfer of EMR through the glass security layer 204 is generally achieved by guided wave transmission. In other words, glass security layer 204 generally transmits EMR along its length by the process of total internal reflection. In regards to its properties, glass security layer 204 consists of a core within a cladding. To confine the EMR in the core, the refractive index of the core is greater than that of the cladding. When EMR traveling along the length of glass security layer 204 hits the cladding at an angle the EMR will be completely reflected and confined in the core. The EMR travels along glass security layer 204 bouncing back and forth off of the cladding. Generally, EMR that enters glass security layer 204 within a certain range of angles is propagated. This range of angles is the acceptance cone of glass security layer 204. The size of the acceptance cone is a function of the refractive index difference between the glass security layer 204 core and cladding.

In an embodiment, one or more glass security layers 204 surround all sides of the PCB. For example, respective glass security layers 204 are located upon the top, bottom, front, rear, and side surfaces of daughter PCB 122 and/or PCB 102 and may fully encapsulate the crypto component 124, battery 126, enable device 128, monitor device 130, etc. In another embodiment, a glass security layer 204 may be located within wiring layer(s) 202.

A glass security layer 204 may be located on the perimeter of wiring layer 202. In other words, glass security layer 204 is formed upon the top, bottom, and side surfaces of wiring layer(s) 202. In a particular fabrication, the glass security layer 204 may be laminated to wiring layer(s) 202 utilizing known epoxies used in existing PCB manufacturing. In a fabrication, glass security layer 204 is at least partially comprised of the same glass fibers used in conventional PCB dielectric substrate layers, so that conventional epoxy resins are compatible with glass security layer 204. Alternatively, polyimide-based adhesive bonding films could be used to adhere glass security layer 204 with wiring layer(s) 202.

Security layer 208 is generally formed upon at least the glass security layer 204. Security layer 208 may be further formed upon one or more EMR receivers 206. In an embodiment, the security layer 208 forms a perimeter of the PCB. For example, the security layer 208 may be a conformal coating of the PCB. Security layer may be fabricated from a material that generally blocks EMR that which the EMR receiver 206 is configured to detect from entering and being propagated by the glass security layer 204.

Since the security layer 208 may form a perimeter of the PCB, security layer 208 may have a thickness greater than the height of PCB 102, 122 surface features. In some instances, security layer 208 may be an optically opaque resin that is a conforming material coated upon the PCB that conforms to the contours of the PCB. The security layer 208 may further protect the underlying layers or components of the PCB against moisture, dust, chemicals, and temperature extremes that, if uncoated (non-protected), could result in damage or failure of the electronics mounted upon or imbedded within wiring layer(s) 202 to function. The security layer 208 may be formed from by known fabrication techniques and may be formed from an epoxy, polyurethane, resin, silicon, or the like.

EMR receiver 206 is a device that generally detects EMR flux. EMR receiver 206 may include an EMR measurement device, refractor, and enclosure. The EMR measurement device may be a photo diode, image sensor (e.g., complementary metal oxide semiconductor (CMOS) sensor, charge-coupled device (CCD) sensor), or the like. In an embodiment, EMR measurement device measures EMR flux received from glass security layer 204. In another embodiment, EMR measurement device captures images of an interference or wave pattern of the EMR. The images may be sampled at various time instances and compared to a reference pattern to determine a change in the pattern of the EMR. In an embodiment, the captured pattern is overlaid with the reference pattern to create a moiré pattern that may be analyzed by the monitor device 130 to determine whether the captured interference pattern deviates from the reference interference pattern by a predetermined threshold amount. In an embodiment, during normal operation of the adapter card 100, EMR, a particular range of EMR wavelength, etc. is not able to be received and therefore propagated by glass security layer 204 due to optically opaque security layer 208. The term optically opaque means that security layer 208 does not allow ambient light to pass through security layer 208 to access glass security layer 208. For example, security layer 208 may block, reflect, etc. ambient light such that the ambient light does not enter glass security layer 208. However, upon security layer 208 being accessed, ambient light is able to be received and therefore propagated by glass security layer 204. Therefore, in a particular embodiment, the mere detection of EMR flux by EMR receiver 206 may signal a tamper event. The refractor may generally redirects the path of EMR so that the EMR may be detected by the EMR measurement device. The refractor may redirect the EMR generally along the length of the glass security layer 204 into the EMR measurement device. The housing may generally surround the EMR measurement device and refractor.

Figure 4:
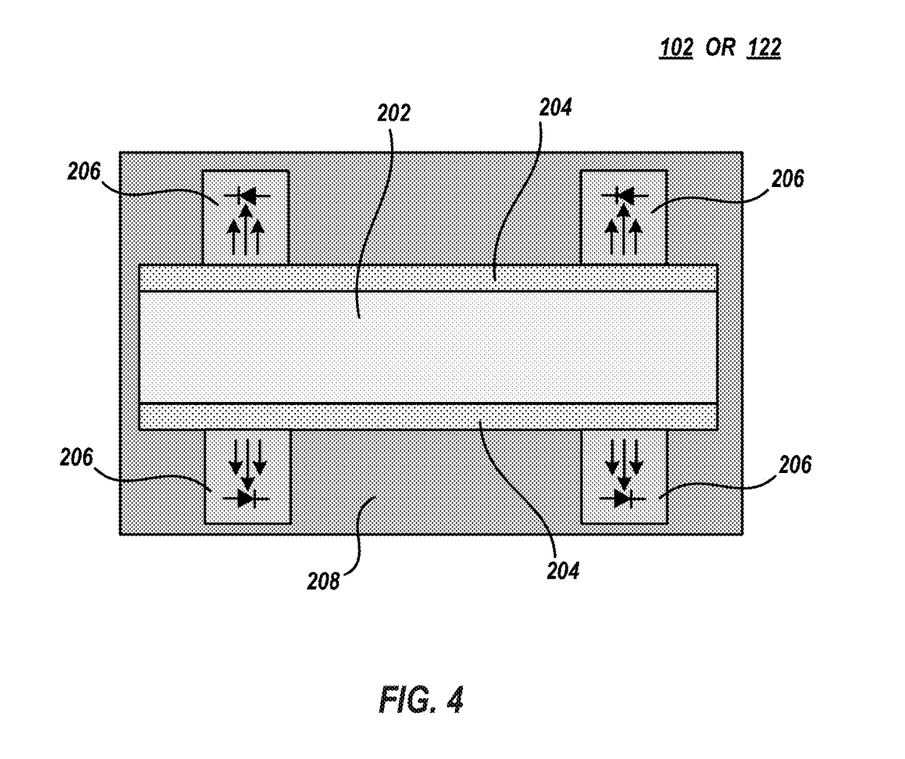
FIG. 4 illustrates an exemplary cross section view of a cryptographic adapter card PCB or a daughter PCB of the cryptographic PCB module, according to various embodiments of the present invention.

In an embodiment, as is shown in FIG. 3, one or more EMR receivers 206 may be located generally upon the side surfaces of the PCB. In another embodiment, as is shown in FIG. 4, one or more EMR receivers 206 may be located upon glass security layer 204.

The EMR receiver 206 is connected to the monitor device 130. The monitor device 130 monitors the actual flux or actual interference pattern of the received EMR at the EMR receiver 206 in relation to the reference flux or the reference interference pattern, respectively. The monitor device 130 may include a register to store the reference value(s). Monitor device 130 passes a tamper signal that is received by one or more computer system devices to respond to the unauthorized physical access of the security layers which causes EMR to be accepted and propagated by the glass security layer 204 and received by EMR receiver 206 when the actual flux of the received EMR at the EMR receiver 206 deviates from the reference flux or reference interference pattern by a predetermined threshold amount.

Figure 5A:
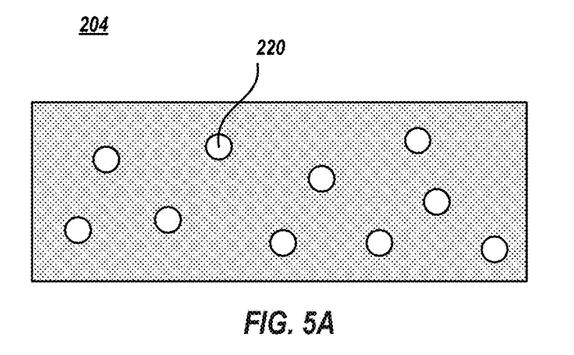
FIG. 5A and FIG. 5B illustrate exemplary cross section views of a glass security layer, according to various embodiments of the present invention.
Figure 5B:
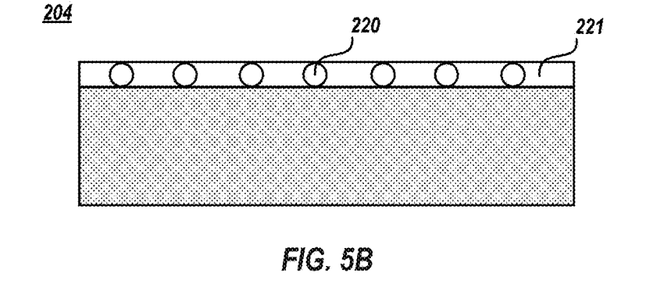

FIG. 5A and FIG. 5B illustrates an exemplary cross section view of glass security layer 204. In some embodiments, glass security layer 204 may include numerous EMR emitters 220 (e.g., luminophores, luminescent solar concentrators, or the like) integrated within the glass security, as is shown in FIG. 5A. In other embodiments, the EMR emitters 220 may be formed upon the top and/or bottom surfaces of the glass security layer 204 as is exemplary shown in FIG. 5B. EMR emitters 220 are luminescent atoms or a luminescent functional group of a chemical compound. In some embodiments, the EMR emitters 220 are embodied within a microsphere or microcapsule. The microspheres may be integrated within glass security layer 204 during its fabrication or may be a part of an EMR emitter layer 221 that is applied, coated, or otherwise formed upon the top and/or bottom surfaces of glass security layer 204.

In some embodiments, EMR emitters 220 are luminescent solar concentrators (LSCs) which are luminophore blends of cyanine and/or cyanine salts integrated into the crystalline structure of glass security layer 204 or within layer 221 upon glass security layer 204. In such embodiments, EMR emitters 220 may, for example, be cyanine derivatives: 2-[7-(1, 3-dihydro-1,3,3-trimethyl-2H-indol-2-ylidene)-1,3,5-heptatrienyl]-1,3,3-trimethyl-3H-indolium (HITC) iodide (HITCI) or 1-(6-(2,5-dioxopyrrolidin-1-yloxy)-6-oxohexyl)-3,3-dimethyl-2-((E)-2-((E)-3-((E)-2-(1,3,3-trimethylindolin-2-lidene)ethylidene)cyclohex-1-enyl)vinyl)-3H-indoliumchloride (CY). Such LSCs are further described in, "Near-Infrared Harvesting Transparent Luminescent Solar Concentrators," authored by Yimu Zhao, Garrett A. Meek, Benjamin G. Levine, and Richard R. Lunt, published by WILEY-VCH Verlag GmbH & Co. KGaA, Weinheim, in Adv. Optical Mater. 2014, which is herein incorporated by reference.

EMR emitters 220 emit EMR by way of luminescence in response to a triggering event. The EMR generated and emitted from EMR emitters 220 may be as a result of chemiluminescence, or the emission of EMR as a result of a chemical reaction, electroluminescence, or the emission of EMR a result of an electric current being passed through a substance, triboluminescence, or the emission of EMR when bonds in a material are broken when that material is scratched, crushed, or rubbed, fractoluminescence, or the emission of EMR generated when bonds in certain crystals are broken by fractures, piezoluminescence, or the emission of EMR produced by the action of pressure on certain solids, photoluminescence, or the emission of EMR as a result of absorption of photons, radioluminescence, or the emission of EMR as a result of bombardment by ionizing radiation, thermoluminescence, or the emission of EMR as a result of the absorption of energy due to a substance being heated, cryoluminescence, or the emission of EMR as due to a substance being cooled.

Figure 6A:
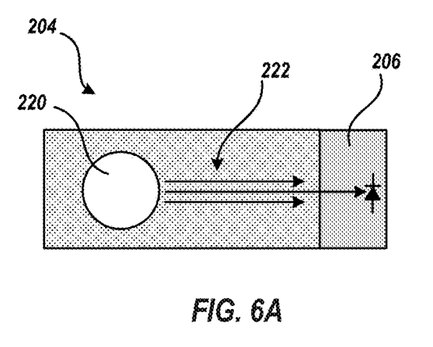
FIG. 6A and FIG. 6B illustrate exemplary views of a glass security layer subsequent to a physical access, according to various embodiments of the present invention.
Figure 6B:
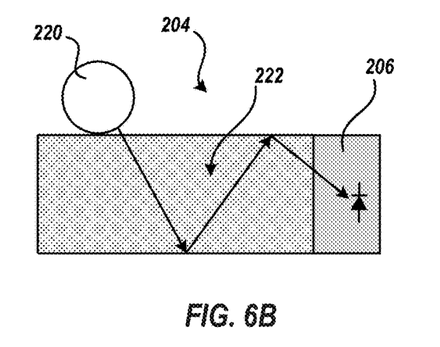

When the glass security layer 204 and/or the security layer 208 is accessed or when the PCB is cooled or heated, as is described below, the EMR emitters 220 generally emit EMR flux 222 which is received and/or transferred by the glass security layer 204 and detected at the EMR receiver 206, as is exemplarily shown in FIG. 6A and FIG. 6B.

The EMR generated and emitted from EMR emitters 220 as a result of chemiluminescence may be triggered by the accessing of security layer 208 and exposing of the underlying portion of glass security layer 204 such that a substance may contact and react with the EMR emitters 220 of glass security layer. The EMR generated and emitted from EMR emitters 220 as a result of electroluminescence may be triggered by the accessing of the security layers and unauthorized contacting of a current carrying probe to wiring layer(s) 202 such that the current passes through one or more EMR emitters 220.

The EMR generated and emitted from EMR emitters 220 as a result of triboluminescence may be triggered by the accessing of the security layers such that bonds of the EMR emitter 220 are broken when the glass security layer 204 is scratched, crushed, or rubbed. The EMR generated and emitted from EMR emitters 220 as a result of fractoluminescence may be triggered by the accessing and resulting fracturing or shattering of a portion of glass security layer 204 such that bonds of the EMR emitter 220 are broken. The EMR generated and emitted from EMR emitters 220 as a result of piezoluminescence may be triggered by the application of externally applied (i.e., external to the cryptographic adapter card 100 in and of itself) pressure to glass security layer 204.

The EMR generated and emitted from EMR emitters 220 as a result of photoluminescence may be triggered by the accessing of security layer 208 (e.g. drilling, scratching, etc.) such that EMR (e.g., ambient light, or the like) is no longer blocked from EMR emitters 220 (e.g., from entering and propagating through glass security layer) such that the EMR is absorbed by EMR emitters 220 which, in turn, emit EMR that is further emitted and propagated through glass security layer 204. For example, an unauthorized entity, wanting to reverse engineer, obtain cryptographic data, etc., accesses the PCB with such that security layer 208 no longer blocks glass security layer 204 from being exposed to ambient light. The ambient light enters the glass security layer 204 and/or is exposed to the LSCs within or upon glass security layer 204. The LSCs, in turn, emit EMR via luminesce which is propagated by the glass security layer 204 and received at EM receiver 206.

The EMR generated and emitted from EMR emitters 220 as a result of radioluminescence may be triggered by the accessing of the security layers such that radiation is no longer blocked from EMR emitters 220 such that the radiation is absorbed by EMR emitters 220 which, in turn, emit EMR that is propagated through glass security layer 204.

The EMR generated and emitted from EMR emitters 220 as a result of thermoluminescence may be triggered by the heating of PCB (e.g., the PCB is placed in an oven, PCB is heated by friction as a result of drilling into the PCB, the PCB is heated by the etching of the PCB with a laser, etc.)

and the EMR generated and emitted from EMR emitters 220 as a result of cryoluminescence may be triggered by the cooling of the PCB (i.e., the PCB is placed in a freezer). In such applications, monitor device 130 may send the tamper signal when the EMR emitted from the EMR emitters 220 is detected at one or more EMR receivers 206.

For example, an unauthorized entity, wanting to reverse engineer, obtain cryptographic data, etc., places the PCB into an oven (e.g. solder oven, etc.) or freezer or otherwise accesses one or more of the security layers of the PCB by drilling, sawing, cutting, laser cutting, or the like. The heating of the PCB causes the LSCs within or upon the glass security layer 208 to be heated and, in turn, to emit EMR via luminesce which is propagated by the glass security layer 204 and received at EM receiver 206.

In various embodiments, the material or makeup of various EMR emitters 220 may differ. For example, a first luminophore of a first EMR emitter 220 may differ relative to second luminophore within a second EMR emitter 220. Such different luminophores may be chosen to emit EMR upon a particular access event. For example, one luminophore may be chosen to detect a chemiluminescence triggering event, another luminophore may be chosen to detect a piezoluminescence triggering event, and yet another luminophore may be chosen to detect a thermoluminescence triggering event.

Figure 7:
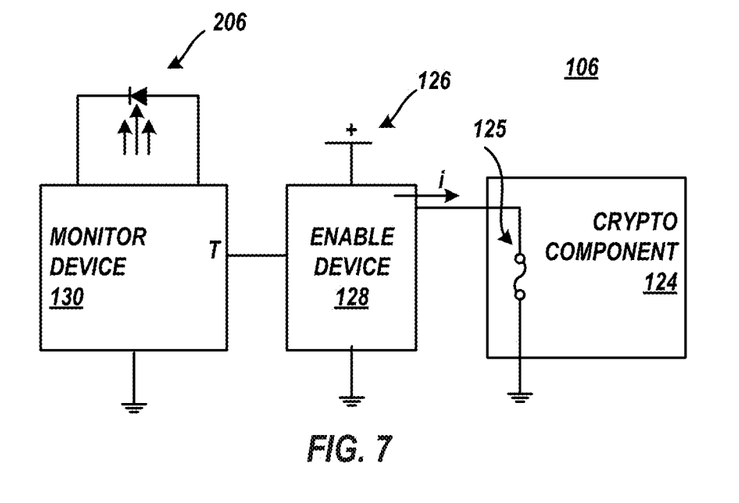
FIG. 7 illustrates an exemplary block circuit diagram of a cryptographic adapter card PCB and/or a daughter PCB of the cryptographic PCB module, according to various embodiments of the present invention.
Figure 8:
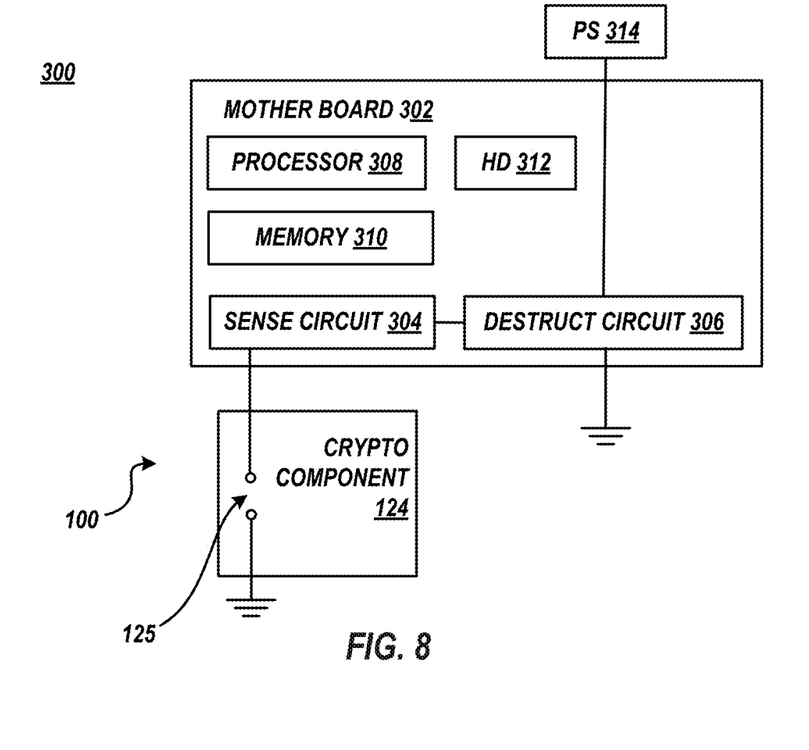
FIG. 8 illustrates a block diagram of an exemplary computer including a cryptographic adapter card PCB and/or a daughter PCB of the cryptographic PCB module, according to various embodiments of the present invention.

FIG. 7 illustrates an exemplary block circuit diagram of secure crypto module 106 that utilizes various embodiments of the present invention. Monitor device 130 at least includes or is electrically connected to EMR receiver 206. For example, monitor device 130 is electrically connected to the measurement device within EMR receiver 206. Further, monitor device 130 is communicatively connected to or includes enable device 128 such that monitor device 130 is able to send a tamper signal from monitor device 130 to enable device 128. Monitor device 130 is an electrical component or circuit (e.g., integrated circuit, chip, FPGA, etc.) that monitors the actual flux or actual interference pattern of the received EMR at the EMR receiver 206 in relation to the reference flux or reference interference pattern respectfully. In an embodiment, the monitor device 130, enable device 128, and the crypto component 124 are the same device (i.e., processor, co-processor). In another embodiment, the monitor device 130 and the enable device 128 are the same device. In yet another embodiment, the monitor device 130, enable device 128, and the crypto component 124 are discrete components or devices.

The monitor device 130 may include a register or internal storage area to store the reference values. The monitor device 130 passes a tamper signal (e.g., signal "T", etc.) that is received by one or more computer system devices to respond to the unauthorized physical access of the glass security layer 204 when the actual flux of the received EMR at the EMR receiver 206 deviates from the reference flux or reference interference pattern by a predetermined threshold amount.

Monitor device 130 continuously, periodically, etc. determines whether the EMR flux or interference pattern received at EMR receiver 206 is the expected reference EMR flux or reference interference pattern or falls within a predetermined acceptable range similar to the expected reference EMR flux or reference interference pattern. For example, it may be predetermined that under normal operating conditions monitor device 130 should not detect any EMR flux received at EMR receiver 206 and may pass the tamper signal to enable device 128 upon any detection thereof.

When the actual received EMR flux is greater than the predetermined expected EMR flux or when actual received interference pattern is different relative to the predetermined expected EMR interference pattern, monitor device 130 generates and sends an enable signal to an intermediary device, such as enable device 128 or directly to crypto component 124. For example, a default signal generated and sent from monitor device 130 to enable device 128 may be a low "0" signal. Upon the monitor device 130 detecting the received EMR flux is greater than the expected received EMR flux, the enable signal is generated and sent from monitor device 130 to enable device 128 as a high "1" signal indicating that the security layers have been accessed or the PCB has been heated or cooled as described above.

Enable device 128 has or is connected to electrical potential and connected to a destruct feature 125 within crypto component 124. The electrical potential may be the power supply of cryptographic adapter card PCB 122 or motherboard PCB 102 if the system is in operation. If the system is non-operational or the system power supply is unavailable, the electrical potential is battery 126, as is exemplarily shown in FIG. 7. Upon receipt of the enable signal, enable device 128 directs current to destruct feature 125 thereby programming the destruct feature 125 within crypto component 124. In a particular embodiment, destruct feature 125 may be a fuse or other one time programmable logic device. The programming of the destruct feature 125 may result in zeroization of area(s) of the one or more crypto components 124 where sensitive data is stored, disables the crypto component 124, etc.

Figure 9:
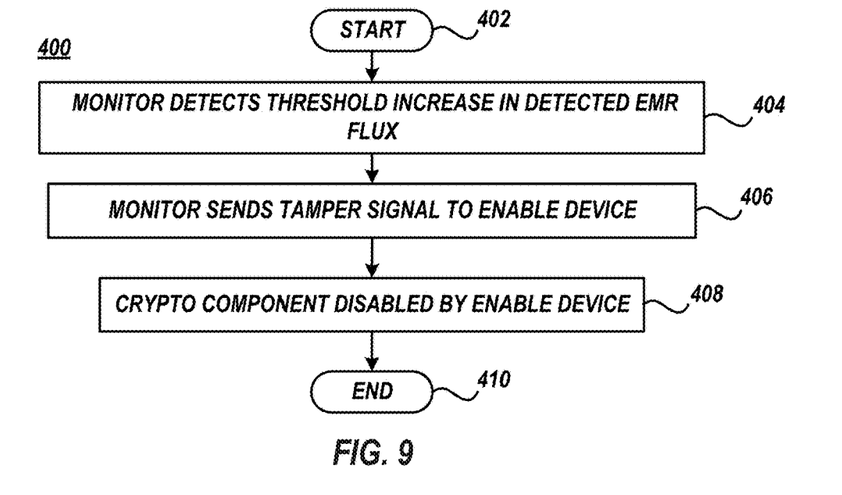
FIG. 9 and FIG. 10 illustrate exemplary methods of detecting and responding to an unauthorized attempt of reverse engineering a PCB, according to various embodiments of the present invention.

FIG. 9 illustrates of block diagram of a computer 300 including a cryptographic adapter card 100 that utilizes various embodiments of the present invention. In addition to computer devices such as memory 310, processor 308, etc., the computer motherboard 302 also includes a sense circuit 304 and a destruct circuit 306. The sense circuit 304 senses, monitors, or otherwise detects that destruct feature 125 has been programmed within one or more crypto components 124. Destruct circuit 306 is connected to a power supply 314, such as the power supply of computer 300. Upon sense circuit 304 determining destruct feature 125 within one or more crypto components 124 has been programmed, destruct circuit 306 zeros area(s) of the computer 300 where sensitive data is stored (e.g., a hard drive 312, memory 310, etc.) and/or one or more functions of the computer 300 are permanently disabled. For example, the processor 308 or memory 310 may be disabled; an application program interface associated with crypto functions of secure crypto module 106 may be disabled, a data bus for communicating data between the processor 308 and the cryptographic adapter card 100 may be disabled, etc.

FIG. 9 illustrates an exemplary method 400 of detecting and responding to an unauthorized attempt of reverse engineering of a PCB 102/and or PCB 122 that includes security layers, according to various embodiments of the present invention. Method 400 may be utilized by a cryptographic adapter card 100 that includes secure crypto module 106, crypto component 124, monitor device 130, a glass security layer 204, and security layer 208.

Method 400 begins at block 402 and continues by monitor device 130 detecting that EMR receiver 206 has actually received or detected EMR flux transmitted by the glass security layer 204 that is greater than the predetermined expected or reference EMR flux or reference interference pattern by a predetermined threshold amount (block 404) which indicates that glass security layer 204 and or security layer 208 has been accessed or that PCB 102 and/or PCB 122 has been subject to an unauthorized heating or cooling.

Method 400 may continue with the monitor device 130 sending a tamper signal to enable device 128 (block 406). For example, the monitor device 130 sends a high "1" tamper or enable signal to enable device 128 to generally instruct enable device 128 to program a destruct feature 125 within crypto component 124.

Method 400 may continue with crypto component 124 being disabled by the enable device 128 (block 408). For example, the programming of destruct feature 125 results in zeroization of area(s) of the one or more crypto components 124 where sensitive data is stored, renders the crypto component 124 inoperable, causes the crypto component 124 to perform spoof functions, causes the crypto component 124 to perform self-destruct functions, the activating of a tamper bit/byte within a crypto component 124 register, etc. Method 400 ends at block 410.

Figure 10:
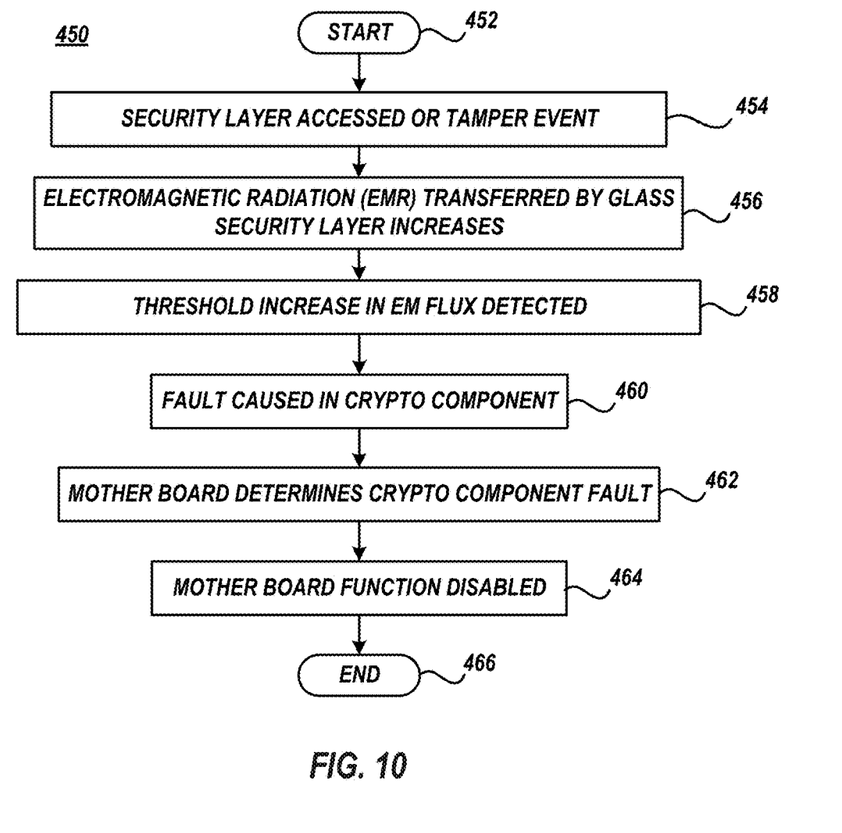

FIG. 10 illustrates an exemplary method 450 of detecting and responding to an unauthorized attempt of reverse engineering a PCB 102/and or PCB 122 that includes a security layers, according to various embodiments of the present invention. Method 450 may be utilized by a computer 300 that includes a motherboard 302 that includes a sense circuit 304, and a destruct circuit 306, and a cryptographic adapter card 100 connected thereto. The cryptographic adapter card 100 includes a secure crypto module 106, crypto component 124, monitor device 130, a glass security layer 204, and a security layer 208.

Method 450 begins at block 452 and continues with one or the security layers being accessed (block 454). For example, a point load, a drill, saw, etc. penetrates the boundary of the upper or lower surface of the glass security layer 204 and or security layer 208 as a result of an unauthorized physical access of the PCB. For example, hole of 0.004 inches in diameter is drilled through the security layer 208 and into the glass security layer 204, etc. The physical access generally results in at least partial removal or displacement of a portion of one or more of the security layers or increased pressure upon the security layers from an unauthorized external load upon the PCB. Alternatively, at block 454, method 450 may continue with glass security layer 204 being heated or cooled. For example, the PCB may be placed in an oven or freezer, is etched, drilled, etc., such that heat is transferred to/from glass security layer 204.

Method 450 may continue with an increased EMR flux being transferred by the glass security layer 204 to the EMR receiver 206 (block 456). For example, upon the security layer 208 being accessed and upon ambient light entering glass security layer 204, increased EMR flux is received by the EMR receiver 206. In the present example, security layer 208 typically blocks ambient light from entering glass security layer 204 and thus upon the access of the security layer 208 the glass security layer 204 is exposed and additional EMR is accepted into the glass security layer 204 and the flux of EMR received at EMR receiver 206 is increased.

In other implementations that include EMR emitters 220 associated with the glass security layer 204, the amount of EMR flux received at EMR receiver 206 is increased due to EMR emitters 220 emitting EMR that is otherwise configured to not be emitted but for the physical access of one or more of the security layers or the heating or cooling of the PCB.

In a particular implementation, the EMR generated and emitted from EMR emitters 220 is a result of chemiluminescence and is triggered by the accessing of security layer 208 and exposing of the underlying portion of glass security layer 204 to an ambient reactant such as a liquid or gas. In such implementation, security layer 208 is nonporous and normally does not allow the reactant to access glass security layer 204. The term "nonporous" means that structure of security layer 208 does not allow the reactant to pass through security layer 208 to access glass security layer 204. However, because the glass security layer 204 is exposed by the accessing, the ambient reactant reacts with the EMR emitters 220 such that EMR is generated by luminescence and emitted from EMR emitters 220. In the present example, security layer 208 typically blocks the reactant from reacting with the EMR emitters 220 of the glass security layer 204 because layer 208 is nonporous. However, upon the access of the security layer 208 the underlying glass security layer 204 and associated EMR emitters 220 are exposed and additional EMR is accepted into the glass security layer 204 and the flux of EMR received at EMR receiver 206 is increased.

In another implementation, the EMR generated and emitted from EMR emitters 220 is a result of electroluminescence and is triggered by the accessing of the security layers and unauthorized contacting of a probe to wiring layer(s) 202 underlying the security layers such that the probe causes electrical current to pass through one or more EMR emitters 220. The accessing of the security layers allows the probe to access wiring layer 202 and may cause an electrical short that results in current flowing across EMR emitters 220. In the present example, such current is not typically allowed to flow across the EMR emitters 220 and is a result of the unauthorized accessing of the PCB. However, upon the access of the security layer 208 the underlying glass security layer 204 a probe causes current to flow across EMR emitters 220 and additional EMR is accepted into the glass security layer 204 and the flux of EMR received at EMR receiver 206 is increased.

In another implementation, the EMR generated and emitted from EMR emitters 220 is a result of triboluminescence and is triggered by the accessing of the security layers such that bonds of the EMR emitter 220 are broken when the glass security layer 204 is scratched, crushed, or rubbed. Because the glass security layer 204 accessed and subject to being crushed or rubbed such that the bonds of the EMR emitter 220 are broken and EMR is generated by luminescence and emitted from EMR emitters 220. In the present example, glass security layer 204 is designed to typically not be scratched or rubbed. However, upon the access of the security layer 208 the underlying glass security layer 204 and such accessing of glass security layer 204, EMR emitters 220 emit EMR by luminescence and, as such, additional EMR is accepted into the glass security layer 204 and the flux of EMR received at EMR receiver 206 is increased.

Similarly, in another implementation, the EMR generated and emitted from EMR emitters 220 is a result of fractoluminescence and is triggered by the accessing of the security layers such that bonds of the EMR emitter 220 are broken when the glass security layer 204 is shattered. Because the glass security layer 204 accessed shattered, the bonds of the EMR emitter 220 likewise broken and EMR is generated by luminescence and emitted from EMR emitters 220. In the present example, glass security layer 204 is designed to typically not be shattered. However, upon the access of the security layer 208 the glass security layer 204 shatters (e.g., the glass layer 204 may be a tempered glass layer that causes the entire layer to shatter as a result of a point load) and such accessing of glass security layer 204, EMR emitters 220 emit EMR by luminescence and, as such, additional EMR is accepted into the glass security layer 204 and the flux of EMR received at EMR receiver 206 is increased.

Likewise, in another implementation, the EMR generated and emitted from EMR emitters 220 is a result of piezoluminescence and is triggered by the application of externally applied pressure to glass security layer 204. In the present example, glass security layer 204 is designed to typically not be under an externally applied load. However, upon such a load, glass security layer 204 becomes under compression and the, EMR emitters 220 emit EMR by luminescence and, as such, additional EMR is accepted into the glass security layer 204 and the flux of EMR received at EMR receiver 206 is increased.

In another implementation, the EMR generated and emitted from EMR emitters 220 is a result of photoluminescence and is triggered by the accessing of security layer 208 such that EMR (e.g., ambient light, or the like) is no longer blocked from entering into glass security layer 204. In the present example, the security layer 208 generally blocks ambient light from entering glass security layer 204. However, upon the accessing of security layer 208, EMR (e.g., ambient light, or the like) is no longer blocked from entering into glass security layer 204. The ambient light is absorbed by EMR emitters 220 which, in turn, emit EMR that is further propagated through glass security layer 204. As such, additional EMR is accepted into the glass security layer 204 and the flux of EMR received at EMR receiver 206 is increased.

Likewise, in another implementation, the EMR generated and emitted from EMR emitters 220 is a result of radioluminescence and is triggered by the accessing of the security layers and reception of radiation by glass security layer 204 such that radiation is no longer blocked from entering into glass security layer 204. In the present example, the security layer 208 generally blocks radiation from entering glass security layer 204. However, upon the accessing of security layer 208, radiation is no longer blocked from entering into glass security layer 204. The radiation is absorbed by EMR emitters 220 which, in turn, emit EMR that is further propagated through glass security layer 204. As such, additional EMR is accepted into the glass security layer 204 and the flux of EMR received at EMR receiver 206 is increased.

When, at block 454, method 450 includes glass security layer 204 being heated, the EMR generated and emitted from EMR emitters 220 is result of thermoluminescence and is triggered by the external heating of PCB (i.e., the PCB is placed in an oven). In the present example, the heat energy absorbed by the PCB and by the glass security layer is further absorbed by EMR emitters 220. As a result, EMR is generated and is further propagated through glass security layer 204. As such, additional EMR is accepted into the glass security layer 204 and the flux of EMR received at EMR receiver 206 is increased.

Likewise, when at block 454, method 450 includes glass security layer being cooled, the EMR generated and emitted from EMR emitters 220 is a result of cryoluminescence and is triggered by the external cooling of the PCB (i.e., the PCB is placed in a freezer). In the present example, the heat energy is removed from the PCB and from the glass security layer and is further removed by EMR emitters 220. As a result, EMR is generated and is further propagated through glass security layer 204. As such, additional EMR is accepted into the glass security layer 204 and the flux of EMR received at EMR receiver 206 is increased.

For clarity, the PCB may be configured such that EMR receiver 206 may typically receive a reference flux (greater than zero) during normal operation. In such applications, the increase of EMR is based from such reference flux. In other applications, the PCB may be configured such that EMR receiver 206 typically does not receive any flux (i.e., the reference flux is zero).

Method 450 may continue with monitor device 130 detecting a predetermined threshold amount of flux increase (block 458) which is indicative of the PCB being accessed. For example, the monitor device 130 compares the flux or pattern of the actually received EMR flux at the EMR receiver 206 against the predetermined reference flux or reference interference pattern stored therein.

Method 450 may continue with causing a fault in crypto component 124 (block 460). The fault may be generally the result of the programming of destruct feature 125 within crypto component 124. For example, the fault of crypto component 124 may result in zeroization of area(s) of the one or more crypto components 124 where sensitive data is stored, renders the crypto component 124 inoperable, causes the crypto component 124 to perform spoof functions, causes the crypto component 124 to perform self-destruct functions, causes the activation of a tamper bit/byte within a crypto component 124 register, etc. In an embodiment, the monitor device 130 may directly cause the fault in crypto component 124 (i.e., there are no intermediary devices between monitor device and crypto component 124) and in other embodiments, the monitor device 130 may indirectly cause the fault in crypto component (i.e., an intermediary device, such as enable device 128, causes the fault in crypto component as a result of receiving an instruction by monitor device 130).

Method 450 may continue with motherboard 302 determining that the crypto component 124 has faulted (block 462). The motherboard 302 sense circuit 304 determines, monitors, or otherwise detects that destruct feature 125 has been programmed causing the fault of crypto component 124.

Method 450 may continue with disabling functionality provided by motherboard 302 (block 464). The disabling of functionality is generally the result of detecting the programming of destruct feature 125 within crypto component 124. For example, the fault of crypto component 124 may result in zeroization of area(s) of memory 310, processor 308, hard drive 312, etc. where sensitive data is stored, renders the memory 310, processor 308, etc. inoperable, causes the memory 310, processor 308, etc. to perform spoof functions, causes the memory 310, processor 308, etc. to perform self-destruct functions, etc. Method 450 ends at block 466.

Figure 11:
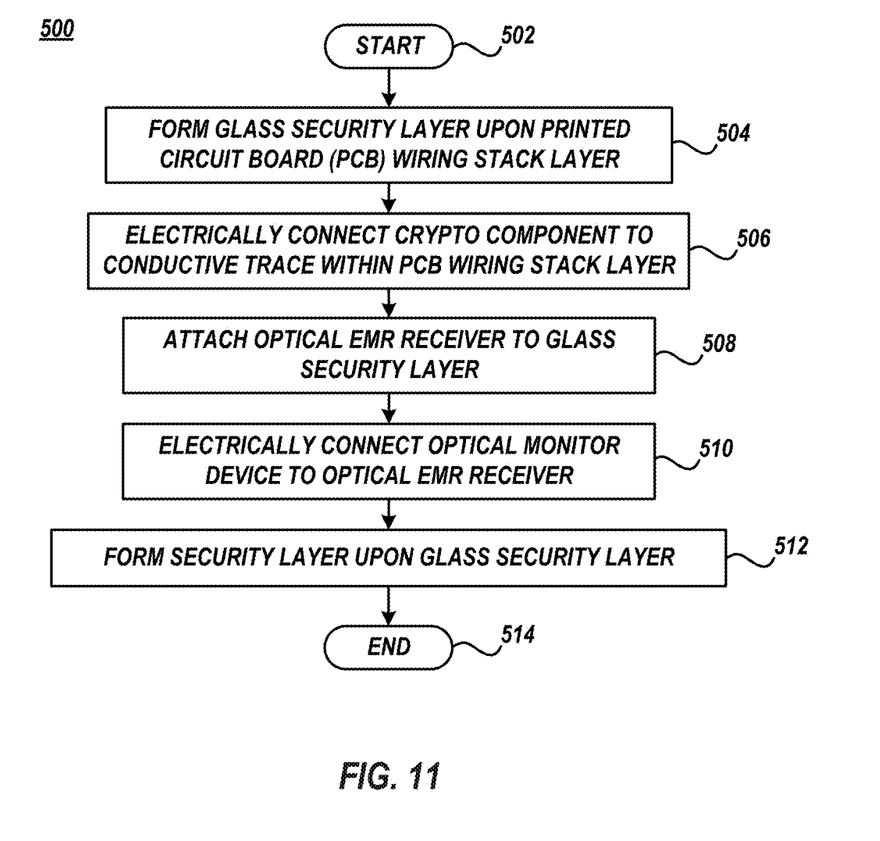
FIG. 11 illustrates an exemplary method of fabricating a cryptographic adapter card PCB or daughter PCB including security layers, according to various embodiments of the present invention.

FIG. 11 illustrates an exemplary method 500 of fabricating a PCB including a secure crypto module 106, crypto component 124, monitor device 130, and security layers including a security layer 208 and a glass security layer 204. For example, method 500 may be utilized to fabricate adapter card PCB 102 and/or daughter PCB 122.

Method 500 begins at block 502 and continues with forming the glass security layer 204 upon a PCB wiring layer(s) 202 (block 504). The wiring layer(s) 202 typically includes one or more wiring dielectric layers and conductive traces formed thereupon, respectively.

Method 500 may continue with electrically connecting crypto component 124 to a conductive trace 204 located within the wiring layer(s) 202 (block 506). Method 500 may continue with attaching EMR receiver 206 to the glass security layer 204 (block 508). For example, the EMR receiver 206 is positioned against, upon, or is otherwise optically connected to the glass security layer such that EMR to be propagated with the glass security layer 204 is directed within the acceptance cone of glass security layer 204 and the EMR exiting the glass security layer 204 is received by the EMR receiver 206, etc.

Method 500 may continue with electrically connecting monitor device 130 to the EMR receiver 206 (block 510). For example, monitor device 130 is electrically connected to the EMR measurement device of EMR receiver 206. Method 500 may continue by forming a security layer 208 upon the glass security layer 204 (block 512). For example, an security layer 208 may be formed upon the glass security layer 204. Method 500 ends at block 514.

For clarity, glass security layer 204 may surround the cryptographic module 110 on at least five sides, the sixth side of cryptographic module 110 being protected by the adapter PCB 102 which would include another instance of glass security layer 204. In another embodiment, glass security layer 204 may surround the cryptographic module 110 on all six sides of the cryptographic module 110 with the sixth side includes a cutout to allow the daughter PCB 122 to be electrically connected to PCB 102 via connectors 129, 103. By surrounding the internal cryptographic module 110, glass security layer 204 generally forms a layer of protection of the cryptographic module 110 by detecting access or environmental changes. In the present embodiment, EMR receiver 206 may be electrically connected to the monitor device 130 by wiring, electrical connectors, or by other known interconnection technologies.

Embodiments of the present invention may be a system, a method, and/or a computer program product. The computer program product may include a computer readable storage medium (or media) having computer readable program instructions thereon for causing a processor to carry out aspects of the present invention. The computer readable storage medium is a tangible device that can retain and store instructions for use by an instruction execution device. The computer readable storage medium may be, for example, but is not limited to, an electronic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A cryptographic printed circuit board (PCB) comprising:
   a glass security layer surrounding the cryptographic PCB, the glass security layer comprising luminescent atoms;
   a crypto component encapsulated by the glass security layer;
   an electromagnetic radiation (EMR) receiver optically connected to the glass security layer; and
   a destruct feature electrically connected to the EMR receiver, the destruct feature is programmed in response to the EMR receiver receiving a predetermined threshold increase of flux of EMR propagated by the glass security layer from at least a portion of the luminescent atoms to the EMR receiver.

2. The cryptographic PCB of claim 1, further comprising:
   a monitor device that generates a tamper signal in response to the EMR receiver receiving the predetermined threshold increase of flux of EMR propagated by the glass security layer from at least the portion of the luminescent atoms to the EMR receiver.

3. The cryptographic PCB of claim 2, further comprising:
   an enable device that upon receipt of the tamper signal from the monitor device programs the destruct feature.

4. The cryptographic PCB of claim 1, further comprising:
   a security layer upon the glass security layer.

5. The cryptographic PCB of claim 4, wherein the luminescent atoms are contained within microspheres within the glass security layer.

6. The cryptographic PCB of claim 5, wherein the security layer is optically opaque and blocks ambient light from the glass security layer.

7. The cryptographic PCB of claim 5, wherein the security layer is nonporous and blocks an ambient reactant from the glass security layer.

8. The cryptographic PCB of claim 1, wherein EMR is propagated by the glass security layer by total internal reflection.

9. A data handling electronic device comprising:
   a motherboard comprising a processor and a memory;
   a cryptographic adapter card, the cryptographic adapter card comprising:
      a printed circuit board (PCB) comprising a connector that interconnects with the motherboard, and
      a secure crypto module comprising a daughter card electrically connected to the PCB;
   the daughter card comprising:
      a glass security layer surrounding the daughter card, the glass security layer comprising luminescent atoms;
      a crypto component encapsulated by the glass security layer;
      an electromagnetic radiation (EMR) receiver optically connected to the glass security layer; and
      a destruct feature electrically connected to the EMR receiver, the destruct feature is programmed in response to the EMR receiver receiving a predetermined threshold increase of flux of EMR propagated by the glass security layer from at least a portion of the luminescent atoms to the EMR receiver.

10. The data handling electronic device of claim 9, wherein the daughter card further comprises:
    a monitor device that generates a tamper signal in response to the EMR receiver receiving the predetermined threshold increase of flux of EMR propagated by the glass security layer to the EMR receiver.

11. The data handling electronic device of claim 10, wherein the daughter card further comprises:
    an enable device that upon receipt of the tamper signal from the monitor device programs the destruct feature.

12. The data handling electronic device of claim 9, wherein the daughter card further comprises:
    a security layer upon the glass security layer.

13. The data handling electronic device of claim 12, wherein the luminescent atoms are contained within microspheres within the glass security layer.

14. The data handling electronic device of claim 13, wherein the security layer is optically opaque and blocks ambient light from the glass security layer.

15. The data handling electronic device of claim 13, wherein the security layer is nonporous and blocks an ambient reactant from the glass security layer.

16. The data handling electronic device of claim 9, wherein EMR is propagated by the glass security layer by total internal reflection.

17. A method of fabricating a cryptographic printed circuit board (PCB), the method comprising:
    forming a glass security layer surrounding the cryptographic PCB, the glass security layer comprising luminescent atoms;
    optically connecting an electromagnetic radiation (EMR) receiver to the glass security layer;
    forming a security layer upon the glass security layer and upon the EMR receiver; and
    electrically connecting a monitor device to the EMR receiver, wherein the monitor device detects a threshold increase of threshold increase of flux of EMR propagated by the glass security layer from at least a portion of the luminescent atoms to the EMR receiver.

18. The method of claim 17, wherein the luminescent atoms are contained within microspheres within the glass security layer.

19. The method of claim 17, wherein the security layer is optically opaque and blocks ambient light from the glass security layer.

20. The method of claim 17, wherein the security layer is nonporous and blocks an ambient reactant from the glass security layer.

* * * * *